United States Patent [19]
Wilkens et al.

[11] Patent Number: 6,031,619
[45] Date of Patent: Feb. 29, 2000

[54] IMAGING SPECTROMETER

[75] Inventors: Jan Henrik Wilkens, Homburg; Claus-Peter Renschen, Dresden, both of Germany

[73] Assignee: OptoMed Optomedical Systems GmbH, Berlin, Germany

[21] Appl. No.: 09/108,545

[22] Filed: Jul. 1, 1998

[30] Foreign Application Priority Data

Jul. 1, 1997 [DE] Germany .................. 197 28 966

[51] Int. Cl.[7] ........................................ G01J 3/51
[52] U.S. Cl. ............................... 356/419; 250/226
[58] Field of Search .................... 356/419, 416; 250/226

[56] References Cited

U.S. PATENT DOCUMENTS

| 4,678,332 | 7/1987 | Rock et al. | 356/328 |
| 5,729,011 | 3/1998 | Sekiguchi | 356/419 |

FOREIGN PATENT DOCUMENTS

| 768 552 | 4/1997 | European Pat. Off. . |
| 44 15 140 | 8/1995 | Germany . |
| 196 16 176 | 10/1997 | Germany . |
| WO 86/02730 | 5/1986 | WIPO . |
| WO 90/10219 | 9/1990 | WIPO . |

OTHER PUBLICATIONS

Article entitled "Fourier Transform Multipixel Spectroscopy and Spectral Imaging of Protoporphyrin in Single Melanoma Cells" written by Zvi Malik, et al. published in Photochemistry and Photobiology, 1996, pp. 608–614.

*Primary Examiner*—F. L. Evans
*Attorney, Agent, or Firm*—Cohen, Pontani, Lieberman & Pavane

[57] ABSTRACT

Disclosed is an imaging spectrometer formed of a number of image forming optical systems, each of which has associated with it a spectral-selective filter, and at least one locally-resolving, spectrally-sensitive optical detector. Spectrally-different object images can be imaged on different local areas of the optical detector by means of the image forming optical systems. The image forming optical systems are embodied as a microlens array. A zoom lens, by means of which a variable local and spectral resolution can be set, is arranged between the optical detector and the microlens array.

11 Claims, 3 Drawing Sheets

IMAGING SPECTROMETER

BACKGROUND OF THE INVENTION

The invention relates to an imaging spectrometer, particularly for use in endoscopes, surgical microscopes and colposcopes for the diagnostic examination of body tissue.

In known endoscopes, white light is connected via a fiber optic system to body cavities, where the light shining in is then reflected, dispersed and absorbed. The reflected and dispersed portion of the light is focussed on a fiber optic image transmitter. The image transmitter usually consists of several thousand individual fibers, which transmit a coherent image from the body. This image is then projected for an observer (e.g., the treating physician) via an endoscopic eyepiece. Alternatively, instead of the eyepiece, a color image camera can be used, so that the reflection images (with negligible dispersion) can be depicted for the observer on a color screen. Using the known endoscopes and imaging techniques describes above; it is possible to diagnose large invasive tumors easily and relatively reliably. However, early, superficial non-invasive carcinomas often remain undetected.

WO A 90/10219 and WO A 86/02730, each show an endoscopic imaging system for tumor diagnosis. The light of a fiber bundle is split into four beam paths. In each beam path, a different color filter is arranged. Behind the color filters, the beam paths are imaged on a intensive CCD camera. The digital image is shown on a screen, which detects an incorrect color image.

All of the systems described provide only a spectrogram without any image information or, at the most, four spectral image data. The use of prisms or color filters requires equal beam paths for imaging the proportional color data. Currently, due to unsolved technical problems with multiple reflections of prisms, no arrangement that produces more than four partial images by means of beam dividers is technically feasible. To reliably diagnose tumors on the basis of image information, however, at least 16- or, preferably 32-spectrally-different partial images that can be simultaneously superimposed are required.

U.S. Pat. No. 4,678,332 discloses an apparatus for the isochronous analysis of the spectrum of an object, wherein the radiation of an object is connected by means of a collector optical system to a fiber optic cross-sectional converter. The virtually linear output radiation is imaged by means of a collimator optical system on a diffraction grating, and then spectrally decomposed and imaged via a further optical system on a matrix-type optical detector.

*Photochemistry and Photobiology*, 1996, 63(5), 608–614 describes an imaging spectrometer wherein interference phenomena during the superimposition of light waves for measurement and observation purposes can be analyzed by means of a Sagnac interferometer. With the help of a scanning process, an interferogram is imaged on a CCD chip. A subsequent Fourier transformation then yields a spectrum on each pixel. Image collection using this procedure takes about 50 seconds. This is followed by an image processing time of 2 to 4 minutes. The images obtained contain 10 to 30 spectral data per image pixel and are well suited for distinguishing between objects with only slight spectral differences. However, the relative slowness of the image processing limits the use of this device to microscopic measurements and to finding objects that are moving slowly or hardly at all. The process and device are therefore unsuitable for clinical imaging. In addition, the optical and mechanical structures of the device are very complex and cost-intensive.

From DE 1996 16 176 A1, a device for recognizing properties of moved objects is known. The device has a detector arrangement equipped with a filter arrangement for recording and exposing images of objects in different wave length ranges; a storage device for storing the wave-length-dependent image point data; and an evaluation unit that, depending on preestablished wave length information on the object and on the wave-length-dependent pixel data, determines the properties of the object. Located between the object and detector arrangement are at least two wave-length-selective filters and, associated therewith, at least two image forming optical systems to project object images of different wavelengths onto different local areas of the detector arrangement. It is disadvantageous in the known device that the adjustment between local and spectral resolution must be preset. Particularly in the area of diagnostics, it is necessary to search a broad tissue region for changes. If suspect tissue is found, it is examined more closely. However, because up to 16 spectral data are needed for unambiguous diagnosis, there is a corresponding limit on local resolution, which in turn makes detection more difficult.

SUMMARY OF THE INVENTION

An object of the present invention is to provide an imaging spectrometer with which a spectral image collection is possible virtually simultaneously, so that the imaging spectrometer is especially suitable for the diagnosis of tumorous tissue, and allows a variable change of the local and spectral resolution.

The invention is an imaging spectrometer formed of a plurality of image forming optical systems each of which has associated with it a spectral-selective filter. The spectrometer also includes at least one local-resolving spectral-sensitive optical detector, whereby spectrally-different object images can be imaged by means of the image forming optical systems on different local areas of the optical detector. The image forming optical systems are embodied as a microlens array. The spectrometer includes a zoom lens by means of which a variable local resolution and spectral resolution can be set. The zoom lens is arranged between the optical detector and the microlens array.

Because the imaging optical systems are embodied as a microlens array, with a zoom lens being arranged between the microlens array and the optical detector, it is possible to switch as needed between high local and high spectral resolution. Furthermore, since beam dividers, stepping motors and interferometers are not required, the structure of the invention is compact and economical.

In one embodiment of the invention, the microlens array is in the form of an active, voltage-controlled LCD microlens array. The spectral filters can be interference and/or absorption filters. Optionally, the spectral filter can be in the form of a filter array and can form an RGB filter set.

The microlens array, the optical detector and the spectral filters can be arranged in a housing. The inner walls of the housing can be blackened or microstructured. The optical detector can be at least one CCD matrix or row.

The lenses of the microlens array may be in the form of small achromatic lenses.

In a preferred embodiment for endoscopic use, the imaging spectrometer is connected to an existing teaching connection. This teaching connection normally allows students or assistant physicians to observe the endoscopic intervention. Image analysis can thus be carried out parallel to the work of the physician. In addition, the device can be embodied as a module that, once adjusted, can be repeatedly removed, so that the device does not need to be disinfected along with the endoscope.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

DETAILED DESCRIPTION OF THE PRESENTLY PREFERRED EMBODIMENTS

Figure 1:
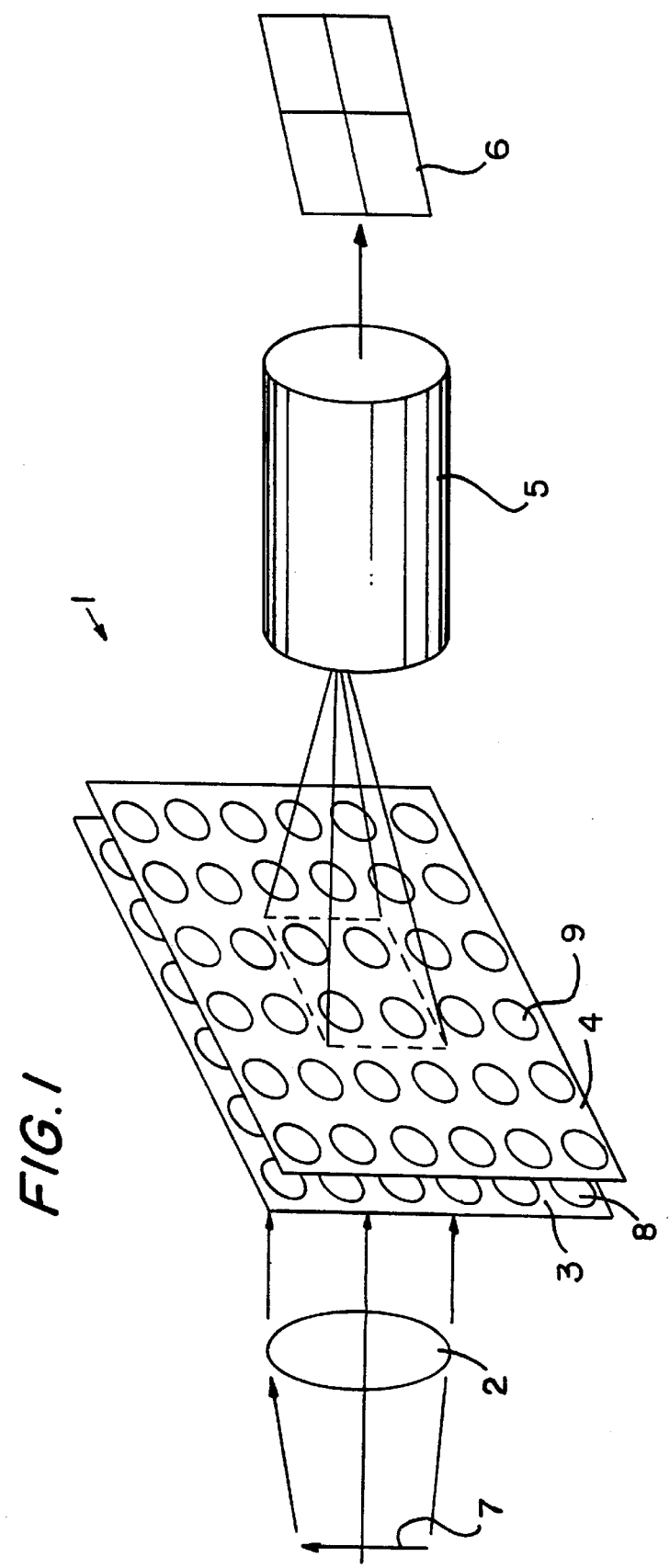
FIG. 1 is a schematic depiction, in perspective, of the imaging spectrometer with high local and low spectral resolution.

Referring to the drawings, an imaging spectrometer 1 is formed of an input optical system 2, a filter array 3, a microlens array 4, a zoom lens 5 and a locally-resolving spectral-sensitive optical detector 6. The light coming from the object 7 to be examined is mixed by means of the input optical system 2 into the half-space located behind and strikes the filter array 3, whereby the complete image information from the object 7 is available on each filter 8 of the filter array 3. The filter array 3 comprises thirty-six filters 8, which are quadratically segmented. Each of the filters 8, which preferably are embodied as interference filters, allows a different spectral range of light to be transmitted. The bandwidth of the filters 8 is approximately 5–20 nm. The advantage of interference filters, compared with absorption filters, is that the former have sharper edges. Of course, for the purpose of producing specific spectral ranges, a combined deployment of interference and absorption filters arranged one behind the other can be advantageous. For flexible adjustment to different problems, the filter array 3 is preferably arranged removably in the imaging spectrometer 1, so that special filter arrays 3 can be employed depending on the area of use. The centrally arranged filters 8, which for this purpose are preferably embodied as absorption filters, are thereby selected in such a way as to form an RGB filter set.

Arranged behind the filter array 3 is a microlens array 4. Preferably, exactly one filter 8 of the filter array 3 is assigned to each lens 9 of the microlens array 4, and the filter array 3 and the microlens array 4 are directed toward each other. In principle, however, the filter array 3 and the microlens array 4 are interchangeable in the arrangement sequence. Preferably, the microlens array 4 is embodied as an active LCD microlens array, whose optical properties can be adjusted within certain ranges by means of a control voltage, so that readjustment is possible after assembly. This is especially advantageous when a separate input optical system 2 is dispensed with and the microlens array 4 itself forms the input optical system of the imaging spectrometer 1. Alternatively, the lenses 9 are in the form of achromatic lenses with a diameter of 2–3 mm and a focal distance of 10–20 mm. Behind the microlens array 4, the complete object image can be imaged vividly on the optical detector in thirty-six different spectral ranges simultaneously. To focus the output radiation of the lens array 4 onto the optical detector 6, as well as to allow a variable change in local and spectral resolution, the zoom lens 5 is arranged between the lens array 4 and the optical detector 6. For better adaptation to the optical detector 6, a square aperture is preferably arranged in front of the zoom lens 5. The focal distance of the zoom lens 5 can be varied from the outside via a control mechanism (not shown). The invariable image plane of the zoom lens 5 is the optical detector 6, which is almost completely illuminated by the zoom lens 5.

Figure 2:
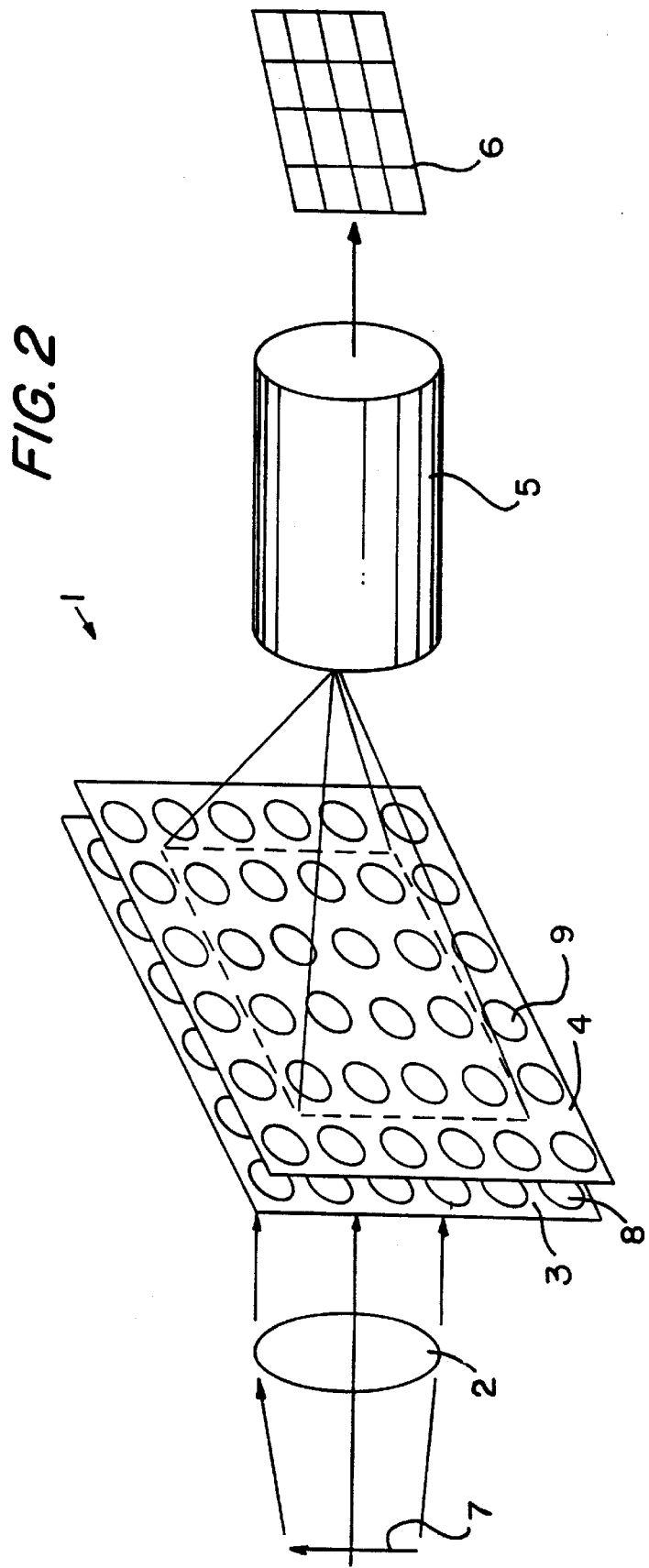
FIG. 2 is a schematic depiction, in perspective, of the imaging spectrometer with medium local and spectral resolution.
Figure 3:
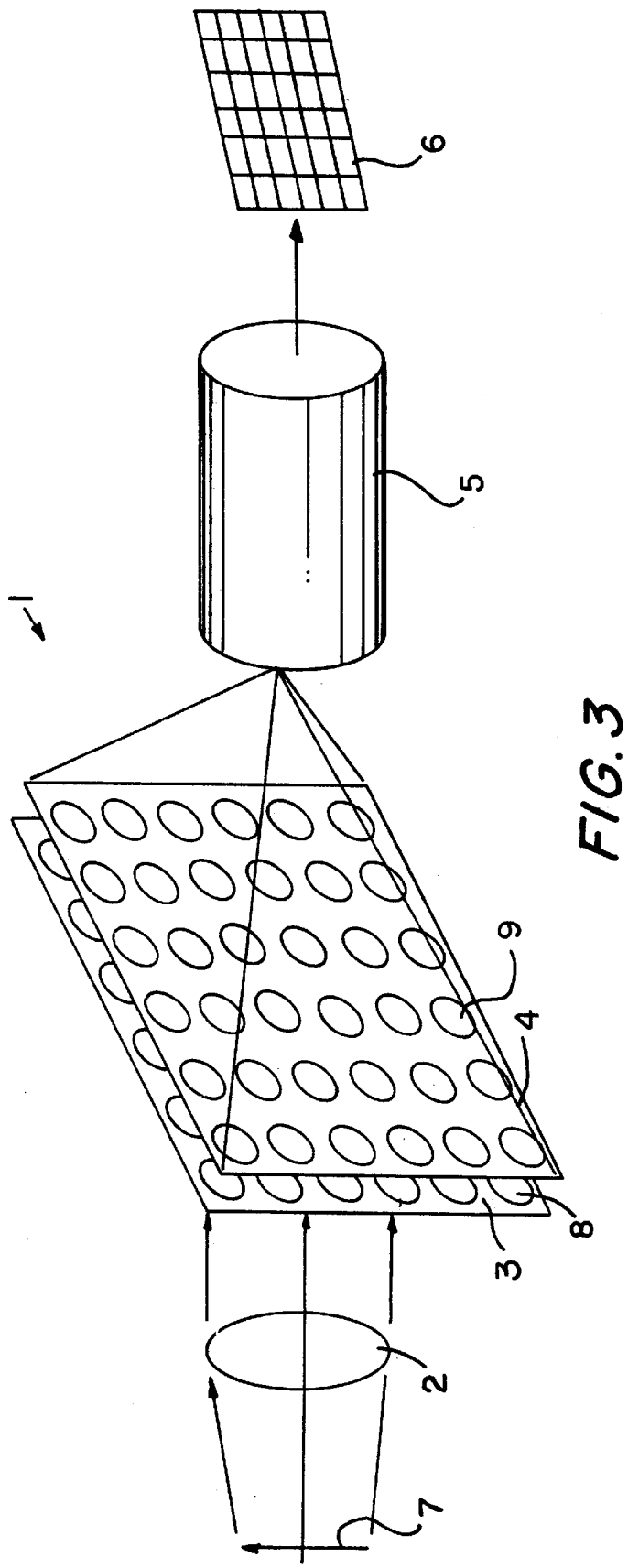
FIG. 3 is a schematic depiction, in perspective, of the imaging spectrometer with high spectral and low local resolution.

In a first setting, the zoom lens 5 images only the output radiation of the four centrally arranged lenses 9 on the optical detector 6, as indicated in FIG. 1 by the dashed line. If the centrally arranged filters 8 are embodied as an RGB filter set, then the object image is imaged, by section, four times on the optical detector 6, with different spectral data in each section. If the optical detector 6 is embodied as a CCD matrix with 1200×1000 pixels, a local resolution of approximately 300,000 pixels thus remains. To increase the spectral resolution, the focal distance of the zoom lens 5 can then be widened in such a way that the sixteen centrally arranged lenses 9 are imaged on the optical detector 6, as shown in FIG. 2 in dashed lines, so that approximately 75,000 pixels are still available for local resolution. In a third setting, the entire filter array 4 can then be imaged on the optical detector 6, so that, upon removal of the centrally arranged RGB filter set, thirty-two different spectral data of the object image can still be depicted, as shown in FIG. 3. To increase the local resolution, it is also possible for the optical detector 6 to be formed by multiple CCD matrices.

Along with the 4-16-36 depiction described above, a 1-9-25 depiction can also be selected. In this case, the centrally arranged filters 8 are preferably embodied with a wide passband, so that a good spectral overview is attained. The advantage of such an embodiment is the increased local resolution in the first setting with the same active surface of the optical detector 6.

It is also possible for multiple respective spectral images to be selected together from the optical detector 6, so that a corresponding color image is created. To suppress unwanted scatter light, the microlens array 4, the associated filter array 3 and the optical detector 6 are arranged in a housing, the inner walls of which are blackened and/or microstructured so that the absorption capacity is almost 1.

In addition to being used specifically in endoscopes, surgical microscopes and colposcopes, the imaging spectrometer 1 can be used in many other fields, e.g., spectral karyotyping of chromosomes, detection of pollutants in air, water and soil, soil analysis, banknote examination, reading faded historical documents, and sorting plastic wastes of the same color but with spectral differences.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

We claim:

1. An imaging spectrometer, comprising:
   a plurality of image forming optical systems embodied as a microlens array;
   a local-resolving spectral sensitive optical detector having local areas thereon whereby spectrally different object images can be imaged by means of the image forming optical systems on different local areas of said optical detector;
   a plurality of spectral-selective filters, each of said plurality of said spectral-selective filters being associated with an optical system of said plurality of image forming optical systems; and a zoom lens, intermediate said optical detector and said microlens array, by means of which a variable local resolution and spectral resolution can be set.

2. The imaging spectrometer of claim 1 wherein the LCD micro array is an active, voltage-controlled LCD microlens array.

3. The imaging spectrometer of claim 1 wherein the spectral filters are embodied as interference filters and/or absorption filters.

4. The imaging spectrometer of claim 1 wherein the microlens array, the optical detector and the spectral filters are arranged in a housing.

5. The imaging spectrometer of claim 4 wherein the housing inner wall are blackened and/or microstructured.

6. The imaging spectrometer of claim 1 wherein the microlens array are embodied as small achromatic lenses.

7. The imaging spectrometer of claim 1 wherein the optical detector comprises at least one CCD matrix or row.

8. The imaging spectrometer of claim 1 wherein the spectral filters are embodied as a filter array.

9. The imaging spectrometer of claim 1 wherein the filters are arranged centrally in the filter array and form an RGB filter set.

10. The imaging spectrometer of claim 1 wherein the imaging spectrometer is a module connectable to an endoscope, surgical microscope or colposcope.

11. The imaging spectrometer of claim 3 wherein the interference filters have a bandwidth of 5 to 20 mm.

* * * * *